(12) United States Patent
Chen et al.

(10) Patent No.: US 12,122,854 B2
(45) Date of Patent: Oct. 22, 2024

(54) GRAFT COPOLYMER AND PREPARATION METHOD AND USE THEREOF

(71) Applicant: ANHUI AGRICULTURAL UNIVERSITY, Hefei (CN)

(72) Inventors: Qi Chen, Hefei (CN); Xiaochun Wan, Hefei (CN); Xiaoyan Guo, Hefei (CN); Zongde Jiang, Hefei (CN); Xiaoqian Wang, Hefei (CN); Yuqin Xia, Hefei (CN)

(73) Assignee: Anhui Agricultural University, Hefei (CN)

( * ) Notice: Subject to any disclaimer, the term of this patent is extended or adjusted under 35 U.S.C. 154(b) by 0 days.

(21) Appl. No.: 18/357,308

(22) Filed: Jul. 24, 2023

(65) Prior Publication Data

US 2024/0124616 A1 Apr. 18, 2024

(30) Foreign Application Priority Data

Sep. 28, 2022 (CN) .......................... 202211195108.1

(51) Int. Cl.
*C08B 31/12* (2006.01)

(52) U.S. Cl.
CPC .................................. *C08B 31/12* (2013.01)

(58) Field of Classification Search
CPC ....... C08B 31/00; C08B 31/125; C08B 31/12; A23L 29/30; A23L 33/105
See application file for complete search history.

(56) References Cited

PUBLICATIONS

Spizzirri et al., Carbohydrate Polymers, 2010, 79, p. 333-340. (Year: 2010).*

Cirillo et al., Pharmaceutical Development and Technology, 2012, 17(4), p. 466-476. (Year: 2012).*

Liu et al., International Journal of Biological Macromolecules, 2018, 116, p. 1011-1025. (Year: 2018).*

* cited by examiner

*Primary Examiner* — Jonathan S Lau
(74) *Attorney, Agent, or Firm* — Troutman Pepper Hamilton Sanders LLP; Christopher C. Close, Jr.

(57) ABSTRACT

A graft copolymer and a preparation method and use thereof. The method for preparing a graft copolymer includes: dissolving an N-ethyl-2-pyrrolidinone-substituted flavan-3-ol (EPSF) and a starch in a polar organic solvent, to obtain a raw material solution; and mixing the raw material solution with ascorbic acid and hydrogen peroxide to obtain a mixture, and subjecting the mixture to a grafting reaction, to obtain the graft copolymer. The graft copolymer has a structural formula represented by formula I or formula II,

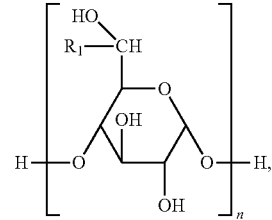

formula I

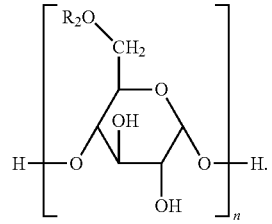

formula II

12 Claims, 4 Drawing Sheets

GRAFT COPOLYMER AND PREPARATION METHOD AND USE THEREOF

REFERENCE TO RELATED APPLICATION

This patent application claims the benefit and priority of Chinese Patent Application No. 202211195108.1 filed on Sep. 28, 2022, the disclosure of which is incorporated by reference herein in its entirety as part of the present application.

FIELD

The present disclosure relates to the field of biomass material technology, and particularly relates to a graft copolymer, and a preparation method and use thereof.

BACKGROUND

EPSFs, as an abbreviated form of N-ethyl-2-pyrrolidinone-substituted flavan-3-ols, are a new type of catechin derivative discovered in recent years. EPSFs are considered as characteristic compounds in Pu'er tea and aged white tea, which are mainly generated by the reaction of catechin components with free theanine during long-term storage, and their production amount can be proportional to the storage time of Pu'er tea or white tea, which can be used to distinguish related storage years. Researchers also have found EPSFs in long-term stored green tea. During the 19-month storage process, the EPSFs content shows a linear increase, with the most significant increase. Also, during the processing of Huangda tea, EPSFs products also increase sharply as the proceeding of high-temperature roasting process, indicating that they are a type of characteristic compounds formed during the tea processing.

In recent years, researches on the physiological functions of EPSFs have shown that as a class of flavonoid alkaloids, EPSFs have various biological activities and are a potentially important functional component in tea leaves. It has been reported that EPSFs can inhibit anti cardiovascular diseases, prevent the occurrence and development of diabetes, and inhibit the activity of acetylcholinesterase, which can be widely used in fields of food, pharmaceuticals and daily chemical products. Compared with EGCG (epigallocatechin gallate), which has significant antioxidative activity in tea leaves, EPSFs have slightly lower antioxidative activity, but have more stable chemical properties, allowing it more suitable for development and use in food.

SUMMARY

In view of the above, the present disclosure provides a graft copolymer, a preparation method and use thereof. The graft copolymer can be obtained by grafting EPSFs onto a starch, and exhibits stable chemical properties and meanwhile good oxidation resistance, thereby broadening the use range of EPSFs.

In order to address the above technical problems, the present disclosure provides an EPSF-starch graft copolymer, having a structural formula represented by formula I or formula II,

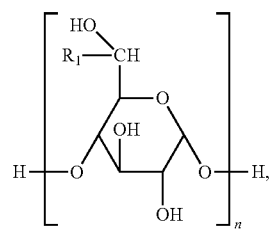

formula I

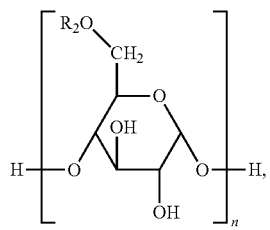

formula II wherein each of $R_1$ and $R_2$ can be independently one selected from the group consisting of

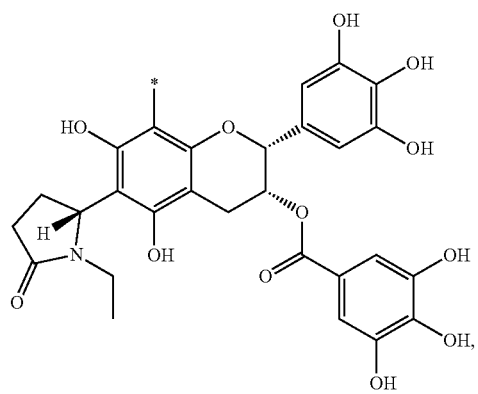

formula 1

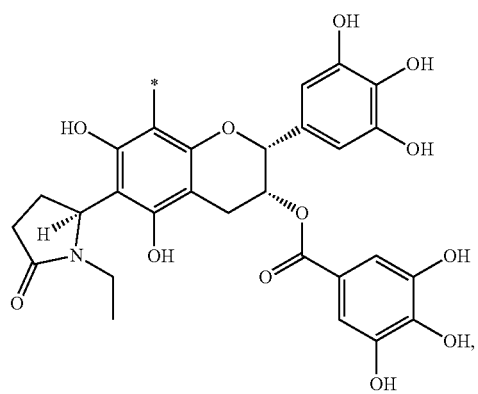

formula 2

-continued formula 3

[Chemical structure of formula 3]

formula 4

[Chemical structure of formula 4]

"*" represents the point of attachment.

In some embodiments, the EPSF-starch graft copolymer has a grafting rate of 15-36 mg/g.

The present disclosure also provides a method for preparing the EPSF-starch graft copolymer as described in above technical solutions, including the steps of
- dissolving an EPSF and a starch in a polar organic solvent, to obtain a raw material solution; and
- mixing the raw material solution with ascorbic acid and hydrogen peroxide to obtain a mixture, and subjecting the mixture to a grafting reaction, to obtain the EPSF-starch graft copolymer.

In some embodiments, the starch includes one selected from the group consisting of corn starch, potato starch, wheat starch, and mung bean starch; and a mass ratio of the EPSF to the starch can be in a range of 1:1 to 1:16.

In some embodiments, the dissolving can be performed at a temperature of 60-80° C. for 25-35 minutes.

In some embodiments, a mass ratio of ascorbic acid to the starch can be in a range of (1-2):(10-20); and a mass ratio of ascorbic acid to hydrogen peroxide can be in a range of (0.1-0.2):(0.1-0.2).

In some embodiments, the grafting reaction can be performed for 3-48 hours.

In some embodiments, the grafting reaction can be carried out in an atmosphere of a protective gas; and the protective gas includes one selected from the group consisting of nitrogen and helium.

In some embodiments, the method further includes, after the grafting reaction, subjecting a system obtained from the grafting reaction to dialysis and drying in sequence; and the dialysis can be performed with a molecular weight cutoff of 8,000-12,000 Da.

The present disclosure also provides use of the EPSF-starch graft copolymer as described in above technical solutions or the EPSF-starch graft copolymer prepared by the method as described in above technical solutions in food, pharmaceuticals or daily chemical products.

The present disclosure provides a graft copolymer, having a structural formula represented by formula I or formula II, formula I

[Chemical structure of formula I]

formula II

[Chemical structure of formula II]

wherein each of $R_1$ and $R_2$ can be independently one selected from the group consisting of formula 1

[Chemical structure of formula 1]

-continued

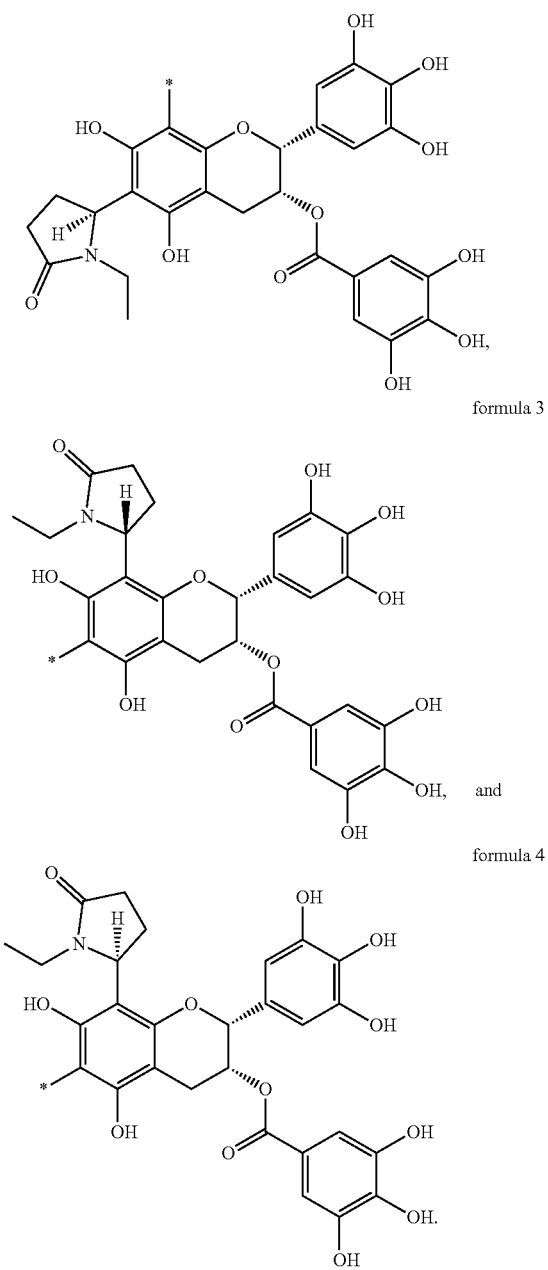

formula 2 formula 3 and formula 4

"*" represents the point of attachment.

The graft copolymer according to the present disclosure has excellent biological activity, such as good antioxidative activity, chemical stability and strong inhibition ability against the hydrolysis by α-amylase, which greatly expands its use space in food, daily chemicals, and pharmaceuticals.

The present disclosure also provides a method for preparing the graft copolymer as described in above technical solutions, including the following steps: dissolving an EPSF and a starch in a polar organic solvent, to obtain a raw material solution; and mixing the raw material solution with ascorbic acid and hydrogen peroxide to obtain a mixture, and subjecting the mixture to a grafting reaction, to obtain the graft copolymer. In the present disclosure, starch and EPSFs can be used as reaction substrates, and ascorbic acid/hydrogen peroxide redox system is adopted to mediate crosslinking reaction to obtain EPSF-starch graft copolymer. The present disclosure adopts a free radical-mediated graft copolymerization reaction to synthesize a macromolecular graft copolymer of EPSFs and starch, which has a high grafting rate.

BRIEF DESCRIPTION OF THE DRAWINGS

So that the manner in which the above recited features of the present invention can be understood in detail, a more particular description of the invention, briefly summarized above, may be had by reference to embodiments, some of which can be illustrated in the appended drawings. It can be noted, however, that the appended drawings illustrate only typical embodiments of this invention and are, therefore, not to be considered limiting of its scope, for the invention may admit to other equally effective embodiments. It can be emphasized that the figures can be not necessarily to scale and certain features and certain views of the figures can be shown exaggerated in scale or in schematic for clarity and/or conciseness.

FIGS. 2A and 2B show curves of DPPH free radical scavenging rate versus different sample concentrations, in which FIG. 2A shows a curve of DPPH free radical scavenging rate versus different concentrations of EPSFs and EGCG, and FIG. 2B shows a curve of DPPH free radical scavenging rate versus different concentrations of starch, EPSF-starch, and EGCG-starch.

FIGS. 3A and 3B show curves of ABTS free radical scavenging rate versus different sample concentrations, in which, FIG. 3A shows a curve of ABTS free radical scavenging rate versus different concentrations of EPSFs and EGCG, and FIG. 3B shows a curve of ABTS free radical scavenging rate versus different concentrations of starch, EPSF-starch, and EGCG-starch.

DETAILED DESCRIPTION

Figure 1:
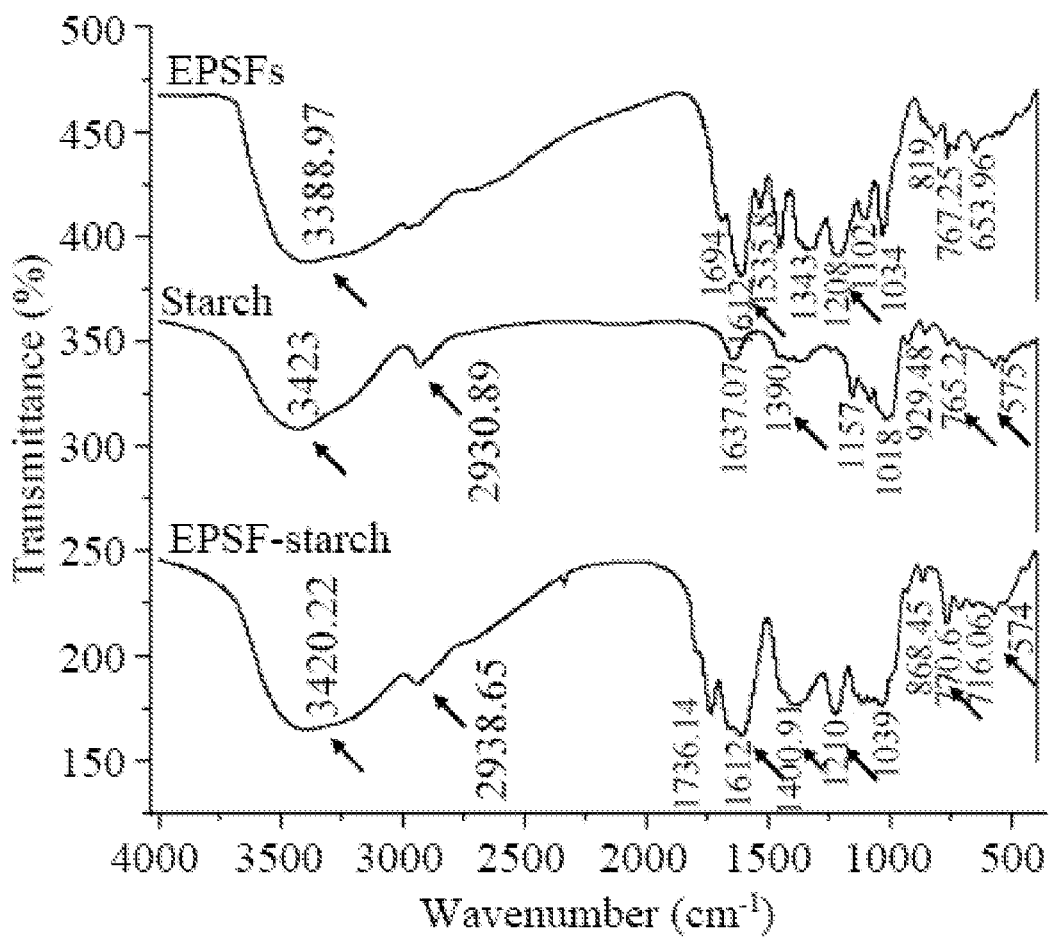
FIG. 1 shows infrared spectra of EPSF-starch, EPSFs, and corn starch in Example 1.

It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure can repeat reference numerals and/or letters in the various embodiments and across the figures provided herein. This repetition is for the purpose of simplicity and clarity and does not in itself dictate a relationship between the various embodiments and/or configurations. Moreover, the exemplary embodiments presented below can be combined in any combination of ways, i.e., any element from one exemplary embodiment can be used in any other exemplary embodiment, without departing from the scope of the disclosure.

Additionally, certain terms are used throughout the following description and claims to refer to particular components. As one skilled in the art will appreciate, various entities can refer to the same component by different names, and as such, the naming convention for the elements described herein is not intended to limit the scope of the invention, unless otherwise specifically defined herein. Further, the naming convention used herein is not intended to distinguish between components that differ in name but not function.

Furthermore, in the following discussion and in the claims, the terms "include" and "comprise" are used in an open-ended fashion, and thus should be interpreted to mean "including, but not limited to."

The term "or" can be intended to encompass both exclusive and inclusive cases, i.e., "A or B" can be intended to be synonymous with "at least one of A and B," unless otherwise expressly specified herein.

The indefinite articles "a" and "an" refer to both singular forms (i.e., "one") and plural referents (i.e., one or more) unless the context clearly dictates otherwise. For example, embodiments using "a pore" include embodiments where one, two, or more pores can be present at a given sample location, unless specified to the contrary or the context clearly indicates that only one pore is present.

Unless otherwise indicated herein, all numerical values can be "about" or "approximately" the indicated value, meaning the values take into account experimental error, machine tolerances and other variations that would be expected by a person having ordinary skill in the art. It should also be understood that the precise numerical values used in the specification and claims constitute specific embodiments. Efforts have been made to ensure the accuracy of the data in the examples. However, it should be understood that any measured data inherently contains a certain level of error due to the limitation of the technique and/or equipment used for making the measurement.

Each of the appended claims defines a separate invention, which for infringement purposes can be recognized as including equivalents to the various elements or limitations specified in the claims. Depending on the context, all references to the "invention" may in some cases refer to certain specific embodiments only. In other cases, it will be recognized that references to the "invention" will refer to subject matter recited in one or more, but not necessarily all, of the claims. Each of the inventions will now be described in greater detail below, including specific embodiments, versions, and examples, but the inventions are not limited to these embodiments, versions, or examples, which are included to enable a person having ordinary skill in the art to make and use the inventions when the information in this disclosure is combined with publicly available information and technology.

The present disclosure provides an EPSF-starch graft copolymer, having a structural formula represented by formula I or formula II, formula I

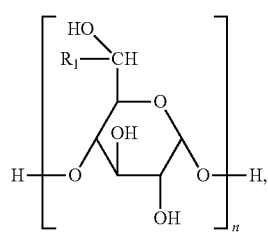

-continued formula II

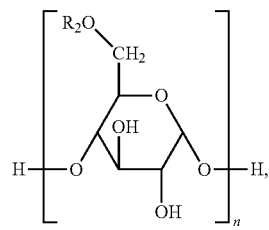

wherein each of $R_1$ and $R_2$ can be independently one selected from the group consisting of formula 1

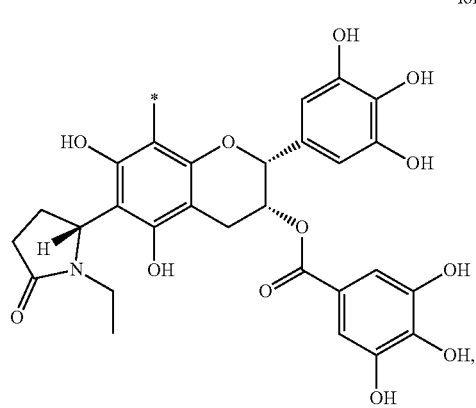

formula 2

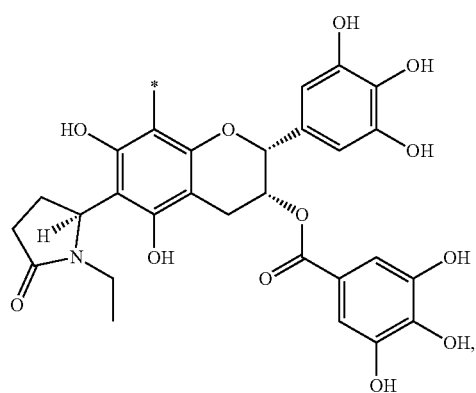

formula 3

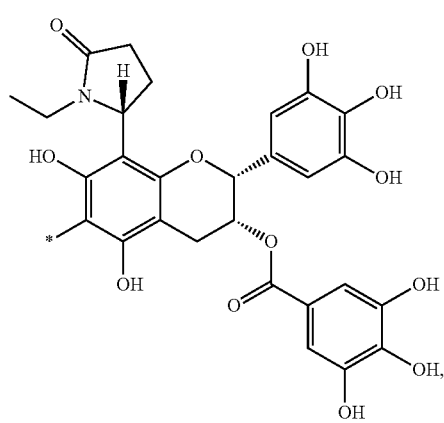

and

-continued formula 4

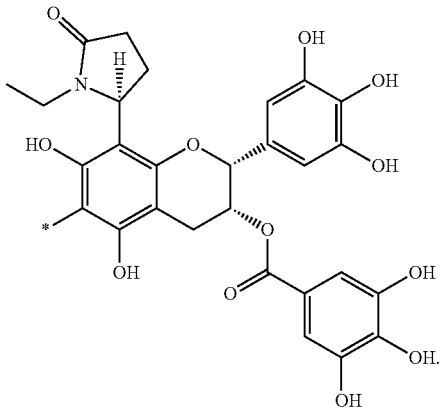

In some embodiments of the present disclosure, the EPSF-starch graft copolymer has a grafting rate of 15-36 mg/g, preferably 15.2-34.7 mg/g, and more preferably 20-27.4 mg/g.

The EPSF-starch graft copolymer according to the present disclosure exhibits good antioxidative activity and inhibition ability against the hydrolysis by α-amylase. The present disclosure solves the problem of low oxidation resistance of EPSFs and expands use scope thereof. The EPSF-starch graft copolymer according to the present disclosure has high scavenging activity against both DPPH and ABTS free radicals, and has a dose-dependent scavenging effect. The results of the embodiments of the present disclosure show that, when the concentration of the graft copolymer can be 2.5 mg/mL, the highest DPPH scavenging rate can be about 95.47%, and the highest ABTS scavenging rate can be about 76.30%. Further, the EPSF-starch graft copolymer according to the present disclosure has inhibition ability against the hydrolysis by a-amylase, and has a dose-dependent inhibition effect. When the concentration of the graft copolymer can be 70 mg/mL, the highest inhibition rate can be 96.92%.

The present disclosure also provides a method for preparing the EPSF-starch graft copolymer as described in above technical solutions, including the steps of dissolving an EPSF and a starch in a polar organic solvent, to obtain a raw material solution; and mixing the raw material solution with ascorbic acid and hydrogen peroxide to obtain a mixture, and subjecting the mixture to a grafting reaction, to obtain the EPSF-starch graft copolymer.

In the present disclosure, the EPSF and the starch are dissolved in a polar organic solvent, to obtain a raw material solution. In some embodiments of the present disclosure, the EPSF includes one or more selected from the group consisting of formula 5

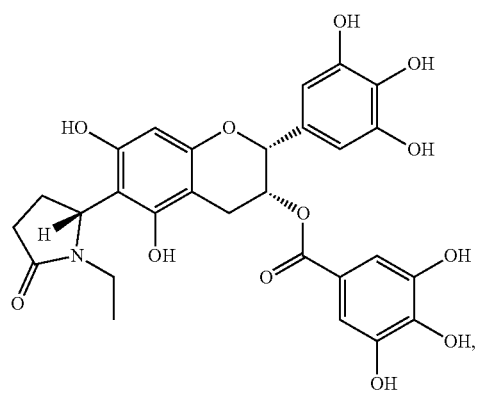

-continued formula 6

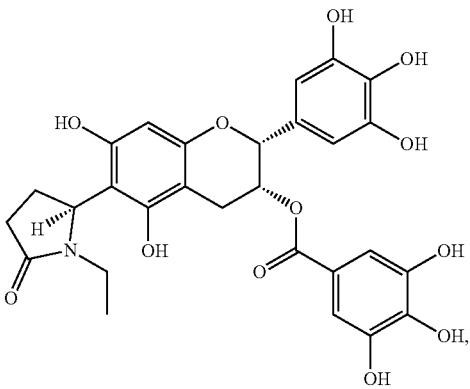

formula 7

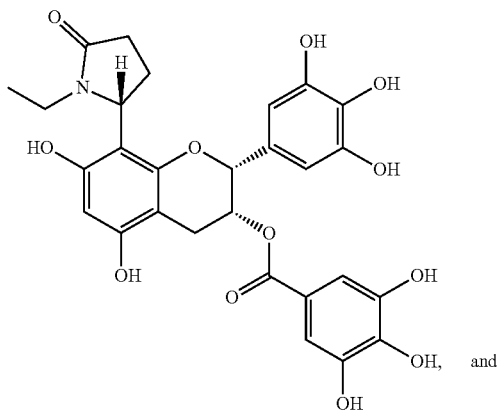

and formula 8

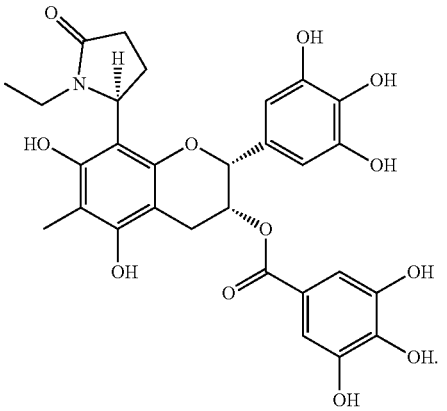

In some embodiments of the present disclosure, the starch includes corn starch, potato starch, wheat starch, or mung bean starch, and preferably can be corn starch. In some embodiments of the present disclosure, a mass ratio of EPSF to the starch can be in a range of 1:1 to 1:16, preferably 1:4: to 1:8, and most preferably 1:4. In some embodiments of the present disclosure, when the mass ratio of the EPSF to the starch can be 1:4, the prepared EPSF-starch graft copolymer has a high grafting rate; when the mass ratio of the EPSF to the starch can be greater than 1:4, the grafting reaction can be limited due to the lack of the reaction substrate of starch, thereby resulting in reduced grafting rate of the EPSF-starch graft copolymer prepared; when the mass ratio of the EPSF to starch can be less than 1:4, the viscosity in the reaction system increases due to the high concentration of starch, which restricts the EPSF monomer from arriving the active site of the growing polymer chain, thereby reducing the grafting rate of the EPSF-starch graft copolymer prepared.

In some embodiments of the present disclosure, the polar organic solvent includes an aqueous solution of an alcohol or dimethyl sulfoxide (DMSO), and preferably can be an aqueous solution of an alcohol. In some embodiments, the aqueous solution of the alcohol includes an aqueous solution of methanol or an aqueous solution of ethanol. In some embodiments, a volume ratio of methanol to water in the aqueous solution of methanol can be in a range of 1:0.8 to 1:1.2, and preferably 1:1. In some embodiments of the present disclosure, a ratio of the mass of the starch to the volume of the polar organic solvent can be in a range of (1-2) g:20 mL, and preferably 1 g:20 mL.

In some embodiments of the present disclosure, the dissolving can be performed at a temperature of 60-80° C., preferably 65-75° C., and more preferably 70° C. In some embodiments, the dissolving can be performed for 25-35 minutes, and preferably 28-30 minutes. In some embodiments of the present disclosure, the temperature for dissolving can be maintained by heating in a water bath. In the present disclosure, under the above conditions, the starch can be fully dissolved, which can be conducive to the full progress of subsequent grafting reaction.

In the present disclosure, after obtaining the raw material solution, the raw material solution, ascorbic acid, and hydrogen peroxide are mixed to obtain a mixture, and the mixture can be subjected to a grafting reaction to obtain the EPSF-starch graft copolymer. In some embodiments of the present disclosure, the mixing includes the following steps: subjecting the raw material solution and ascorbic acid to first mixing to obtain a first mixed solution; and subjecting the first mixed solution and hydrogen peroxide to second mixing to obtain a solution to be reacted.

In the present disclosure, the raw material solution and ascorbic acid can be subjected to first mixing, to obtain a first mixed solution. In some embodiments of the present disclosure, the mass ratio of ascorbic acid to the starch can be in a range of (1-2):(10-20), and preferably 1:10 to 2:10. In embodiments of the present disclosure, the mass ratio of ascorbic acid to the starch can be 2:10, 1:10, or 1:20. In some embodiments of the present disclosure, a mass concentration of ascorbic acid in the first mixed solution can be in a range of 2.5-40 mg/mL, and preferably 5-10 mg/mL. In some embodiments of the present disclosure, when the mass concentration of ascorbic acid in the first mixed solution can be 10 mg/mL, the prepared EPSF-starch graft copolymer has a high grafting rate; when the mass concentration of ascorbic acid in the first mixed solution can be less than 10 mg/mL, the grafting rate of the prepared EPSF-starch graft copolymer increases with the increase in the mass concentration of ascorbic acid; when the mass concentration of ascorbic acid in the first mixed solution can be greater than 10 mg/mL, due to the high concentration of ascorbic acid, the reaction between ascorbic acid and hydrogen peroxide generates too many free radicals (HO·), while the presence of these large numbers of free radicals causes the generated grafting chain to be oxidized and terminated, leading to a decrease in grafting rate.

In the present disclosure, there can be no special requirement for the first mixing, as long as the raw material solution and ascorbic acid could be mixed evenly.

In some embodiments of the present disclosure, the method further includes: after the first mixing, adjusting a pH value of the first mixed solution. In some embodiments of the present disclosure, the pH value of the first mixed solution can be in a range of 5.8 to 6.2, and preferably 6. In the present disclosure, there can be no special requirement for a pH value adjustment agent for adjusting pH value, as long as a required pH value could be achieved.

In the present disclosure, after obtaining the first mixed solution, the first mixed solution and hydrogen peroxide can be subjected to second mixing to obtain the solution to be reacted. In some embodiments of the present disclosure, the method further includes before the second mixing, introducing a protective gas into the first mixed solution. In some embodiments of the present disclosure, the protective gas includes nitrogen or helium, and can be preferably nitrogen. In some embodiments of the present disclosure, the protective gas can be introduced at an inflow rate of 1-4.5 mL/min, and preferably 4 mL/min. In some embodiments, the protective gas can be introduced for 50-70 minutes, and preferably 60-65 minutes.

In the present disclosure, the protective gas can be introduced into the first mixed solution to provide an oxygen free environment and avoid that the N-ethyl-2-pyrrolidinone-substituted flavan-3-ol can be oxidated.

In some embodiments of the present disclosure, a mass ratio of ascorbic acid to hydrogen peroxide can be in a range of (0.1-0.2):(0.1-0.2), and preferably (0.1-0.21):(0.12-0.13). In some embodiments of the present disclosure, hydrogen peroxide can be provided in the form of an aqueous solution of hydrogen peroxide. In some embodiments of the present disclosure, the aqueous solution of hydrogen peroxide has a molar concentration of 8-12 mol/L, and preferably 10 mol/L.

In the present disclosure, there can be no special requirement for means for the second mixing, as long as the first mixed solution and hydrogen peroxide could be mixed evenly.

In some embodiments of the present disclosure, the grafting reaction can be carried out at ambient temperature. In some embodiments, the ambient temperature can be in a range of 20-35° C., and preferably 25-30° C. In some embodiments of the present disclosure, the grafting reaction can be carried out in an atmosphere of a protective gas. In some embodiments, the protective gas includes nitrogen or helium, and preferably can be nitrogen. In some embodiments of the present disclosure, the atmosphere of the protective gas can be provided by introducing the protective gas into the reaction solution. In the present disclosure, there can be no special requirement for the flow rate of the protective gas introduced, as long as the grafting reaction can be carried out in the protective gas. In some embodiments of the present disclosure, the grafting reaction can be carried out in the absence of light. In some embodiments of the present disclosure, the grafting reaction can be conducted in the absence of light to avoid the influence of light on the N-ethyl-2-pyrrolidinone-substituted flavan-3-ol. In the present disclosure, there can be no special requirement for means for the absence of light, and conventional means in the art can be used.

In some embodiments of the present disclosure, the grafting reaction can be performed for 3-4 hours, and preferably 12-24 hours. In the present disclosure, when the grafting reaction can be performed for 12 hours, the obtained EPSF-starch graft copolymer has a higher grafting rate; when the grafting reaction can be performed for less than 12 hours, the grafting rate increases as the grafting reaction time prolongs; when the grafting reaction can be performed for greater than 12 hours, due to that the content of free radicals (HO·) increases with the increase in reaction time, excessive free radicals can be generated, which would cause the already generated grafting chain to be oxidized and terminated, thereby leading to a decrease in grafting rate.

In the disclosure, ascorbic acid exists in the form of diacid in the polar organic solvent, and reacts with hydrogen peroxide to generate hydroxyl free radical, and the generated hydroxyl free radical acts as a free radical initiator, which can extract hydrogen atoms from starch molecules and generate starch large free radicals; the flavan-3-alcohols substituted by N-ethyl-2-pyrrolidone near the reaction site become a receptor of starch large free radicals, thus synthesizing EPSF-starch graft copolymer. In embodiments of the present disclosure, the equation for the grafting reaction can be shown in formula A:

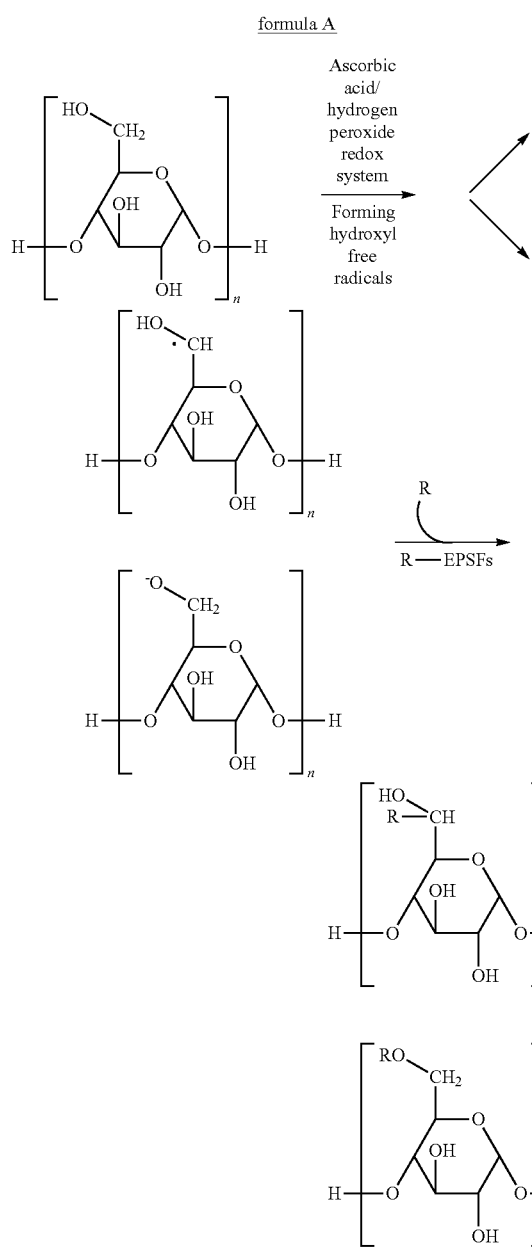

In some embodiments of the present disclosure, the method further includes, after the grafting reaction, subjecting a system obtained from the grafting reaction to dialysis and drying in sequence. In some embodiments of the present disclosure, the dialysis can be performed with a molecular weight cutoff of 8,000-12,000 Da. In some embodiments, the dialysis can be performed for 45-50 hours, and preferably 48 hours. In some embodiments, a dialysate used for the dialysis can be a phosphate buffer solution (PBS buffer solution). In some embodiments, the PBS buffer solution has a molar concentration of 0.01 mol/L. In some embodiments, the PBS buffer solution has a pH value of 8. In some embodiments of the present disclosure, the dialysate can be replaced 8 times during the dialysis process. In some embodiments of the present disclosure, the dialysis can be performed accompanied by stirring. In some embodiments, the stirring can be performed by magnetic stirring. In the present disclosure, unreacted raw materials can be removed through dialysis, and the substance in the dialysis bag can be the EPSF-starch graft copolymer.

In some embodiments of the present disclosure, after the dialysis, the substance EPSF-starch graft copolymer in the dialysis bag can be subjected to drying. In some embodiments of the present disclosure, the drying can be performed by freeze-drying. In some embodiments, the freeze-drying can be carried out in a freeze-drying machine. In the present disclosure, there can be no special requirement for the temperature and time for freeze-drying, as long as the solvent in the EPSF-starch graft copolymer can be removed.

In some embodiments of the present disclosure, the method includes subjecting EPSF-starch graft copolymer powder obtained by drying to granulation and storage. In the present disclosure, there can be no special limitation on the means for the granulation, and conventional means in the art may be used.

The present disclosure also provides use of the EPSF-starch graft copolymer as described in above technical solutions or the EPSF-starch graft copolymer prepared by the method as described in above technical solutions in food, pharmaceuticals, or daily chemical products. In some embodiments of the present disclosure, the EPSF-starch graft copolymer can be used as an antioxidant. In the present disclosure, the EPSF-starch graft copolymer has inhibition ability against the hydrolysis by a-amylase. In some embodiments of the present disclosure, the EPSF-starch graft copolymer can be used as a drug coating material, allowing the drug to be slowly released in the body, thereby improving the therapeutic effect of the drug.

EXAMPLES

In order to further illustrate the present disclosure, the technical solutions according to the present disclosure will be described in detail in conjunction with examples, but the examples cannot be understood as limiting the scope of the present disclosure.

Example 1

In a first example, 250 mg of an EPSF and 1 g of corn starch were dissolved at 70° C. (heated in a water bath for 30 minutes) in 20 mL of an aqueous solution of methanol (with a volume ratio of methanol to water being 1:1), obtaining the raw material solution.

200 mg ascorbic acid and the raw material solution were mixed and the pH value of the resulting mixture was then adjusted, obtaining the first solution with an ascorbic acid mass concentration of 10 mg/mL and a pH value of 6. Nitrogen gas was introduced into the first solution at a flow rate of 4 mL/min for 60 minutes. 0.375 mL of an aqueous solution of hydrogen peroxide with a molar concentration of 10 mol/L was then added to the first solution. The resulting mixture was subjected to a grafting reaction at ambient temperature (25° C.), in the absence of light, and in the atmosphere of nitrogen gas for 12 hours. After the grafting reaction, the system obtained from the grafting reaction was subjected to dialysis for 48 hours (replacing dialysate 8 times), in which, the pore size of a dialysis bag used for the dialysis was in a range of 8,000-12,000 Da; and the dialysate was PBS buffer solution with a molar concentration of 0.01 mol/L and a pH value of 8.0. The mixed solution in the dialysis bag was placed in a freeze-drying machine and freeze-dried, obtaining a solid powder of a EPSF-starch graft copolymer, labeled as EPSF-starch.

Example 2

An EPSF-starch graft copolymer was prepared according to the method in Example 1, except that: the ascorbic acid was used in an amount of 100 mg, and the first solution has an ascorbic acid mass concentration of 5 mg/mL; and the grafting reaction was conducted for 24 hours.

Example 3

An EPSF-starch graft copolymer was prepared according to the method of Example 1, except that: the corn starch was used in an amount of 2 g; and the grafting reaction was conducted for 24 hours.

Example 4

An EPSF-starch graft copolymer was prepared according to the method of Example 1, except that: the corn starch was used in an amount of 2 g; the ascorbic acid was used in an amount of 100 mg, and the first solution has an ascorbic acid mass concentration of 5 mg/mL.

Comparative Example 1

An EGCG-starch solid powder was prepared according to the method of Example 1, labeled as EGCG-starch. During the preparation process, the N-ethyl-2-pyrrolidinone-substituted flavan-3-ol in Example 1 was replaced with epigallocatechin-3-gallate (EGCG).

The grafting rates of EPSF-starch graft copolymers prepared in Examples 1-4 were determined according to the following method. The test results are listed in Table 1. Method for determining grafting rate was as follows: 5 mg of EPSF-starch graft copolymer was dissolved in 50 mL of an aqueous solution of methanol (with a volume ratio of methanol to water being 1:1), obtaining a sample solution; 1 mL of sample solution was mixed with 1 mL of Folin-Ciocalteu reagent (which had been diluted to 10 fold volume) and reacted with each other at 30° C. for 6 minutes; 5 mL of saturated sodium carbonate solution was added thereto, and the resulting mixture was left to stand for 2 hours, the absorbance of which was measured at 765 nm. By using a solution of EPSFs in methanol and water (with a concentration range of 0.007-0.25 mg/mL) as the standard sample, the grafting rate can be calculated as follows: y=3.1107x+0.0494 ($R^2$=0.9929), where x represents the concentration of grafted EPSFs (mg/mL), y represents the absorbance of the mixed solution at 765 nm, and the grafting rate of the graft copolymer was expressed in milligram equivalent of EPSFs per gram of sample.

TABLE 1

Grafting rates of the EPSF-starch graft copolymers prepared in Examples 1 to 4

| Examples | Example 1 | Example 2 | Example 3 | Example 4 |
|---|---|---|---|---|
| Grafting rate (%) | 35.58 | 34.7 | 27.4 | 15.2 |

It can be seen from Table 1 that the EPSF-starch graft copolymer according to the present disclosure has a high grafting rate.

The EPSF-starch graft copolymer prepared in Example 1, the N-ethyl-2-pyrrolidinone-substituted flavan-3-ol (EPSF) in Example 1, and the corn starch in Example 1 were dispersed in KBr, respectively. Granules were then prepared and analyzed by using Fourier transform infrared spectroscopy (FT-IR) to obtain the infrared spectrum, as shown in FIG. 1. Among them, absorbance measurements were conducted within the range of 4,000-400 $cm^{-1}$, with 16 times of scanning and a resolution of 4 $cm^{-1}$.

As can be seen from FIG. 1, the spectrum of EPSF exhibits typical phenolic compound characteristics. The absorption peaks at 1612 $cm^{-1}$ and 1535 $cm^{-1}$ can be attributed to C=C stretching vibration of the aromatic ring. The absorption peak at 1208 $cm^{-1}$ can be attributed to C—O/C—C tensile vibration. The absorption peak of blank starch at 3420 $cm^{-1}$ can be attributed to O—H stretching vibration, the absorption peak at 2930 $cm^{-1}$ can be attributed to C—H stretching vibration, the absorption peak at 764 $cm^{-1}$ can be attributed to C—C bond stretching vibration, and the absorption peak at 576 $cm^{-1}$ can be attributed to the skeletal mode vibration of starch. EPSF-starch can be a substance having natural starch as a bulk, but different from natural starch. EPSF-starch exhibits two new peaks at 1612 $cm^{-1}$ and 1210 $cm^{-1}$, and the graft copolymer exhibits an absorption peak at 1736 $cm^{-1}$ that can be different from that of natural starch and EPSFs, which can be attributed to the vibration of esterified carboxyl groups. The above results indicate that EPSFs has been successfully grafted onto starch, obtaining the EPSF-starch graft copolymer.

The scavenging rate of EPSF-starch on DPPH free radicals was measured as follows: The N-ethyl-2-pyrrolidinone-substituted flavan-3-ol (EPSF) in Example 1 and EGCG in Comparative Example 1 were uniformly dispersed in methanol separately, obtaining dispersions with mass concentrations of 2 μg/mL, 4 μg/mL, 6 μg/mL, 8 μg/mL, 10 μg/mL and 12 μg/mL. The corn starch and EPSF-starch in Example 1, as well as the EGCG-starch in Comparative Example 1, were uniformly dispersed in methanol to obtain dispersions with mass concentrations of 0.156 mg/mL, 0.313 mg/mL, 0.625 mg/mL, 1.25 mg/mL, and 2.50 mg/mL. 2 mL of the above sample dispersions were pipetted in sequence into test tubes, and 2.0 mL of a DPPH solution (0.2 mmol/L, which was prepared with methanol) was added thereto, respectively. The resulting mixture was shaken well, and reacted at ambient temperature in dark for 30 minutes. The absorbance $A_1$ thereof was then measured at 517 nm. Meanwhile, DPPH solution was replaced with an equal amount of methanol solution, and the absorbance $A_2$ thereof was measured according to the above method. The absorbance $A_0$ of a mixture of 2.0 mL of methanol and 2.0 mL of DPPH solution was measured. Experiments of each group were repeated three times, and the DPPH free radical scavenging rate of EPSF-starch was calculated according to Equation 1. The results are listed in Tables 2-1 and 2-2:

$$DPPH \text{ free radical scavenging rate}\% = 1 - \frac{A_1 - A_2}{A_0} \times 100\%; \quad \text{Equation 1}$$

where $A_0$ represents the absorbance of the mixture of methanol and DPPH solution; $A_1$ represents the absorbance of a mixture of the sample dispersion and DPPH free radical solution; and $A_2$ represents the absorbance of a mixture of the sample dispersion and methanol.

TABLE 2-1

DPPH free radical scavenging rate of samples

| Concentration/(μg/ml) | DPPH free radical scavenging rate/% | |
|---|---|---|
| | EGCG | EPSFs |
| 2 | 21.57 ± 0.04 | 29.15 ± 0.55 |
| 4 | 50.98 ± 0.25 | 41.08 ± 0.76 |
| 6 | 67.85 ± 4 | 56.52 ± 1.27 |
| 8 | 88.44 ± 0.27 | 75.12 ± 0.03 |
| 10 | 85.67 ± 2.01 | 84.83 ± 0.82 |
| 12 | 87.39 ± 2.62 | 90.24 ± 1.58 |

TABLE 2-2

DPPH free radical scavenging rate of samples

| Concentration/(mg/ml) | DPPH free radical scavenging rate/% | | |
|---|---|---|---|
| | Starch | EGCG-starch | EPSF-starch |
| 0.156 | 1.71 ± 8.36 | 18.68 ± 7.92 | 33.84 ± 8.49 |
| 0.313 | 0.56 ± 2.83 | 27.55 ± 6.47 | 67.14 ± 2.3 |
| 0.625 | / | 44.56 ± 9.65 | 86.85 ± 2.35 |
| 1.25 | 2.48 ± 1.08 | 80.39 ± 7.89 | 91.43 ± 2.66 |
| 2.5 | 4.02 ± 1.45 | 98.1 ± 2.2 | 92.91 ± 2.84 |

Figure 2A:
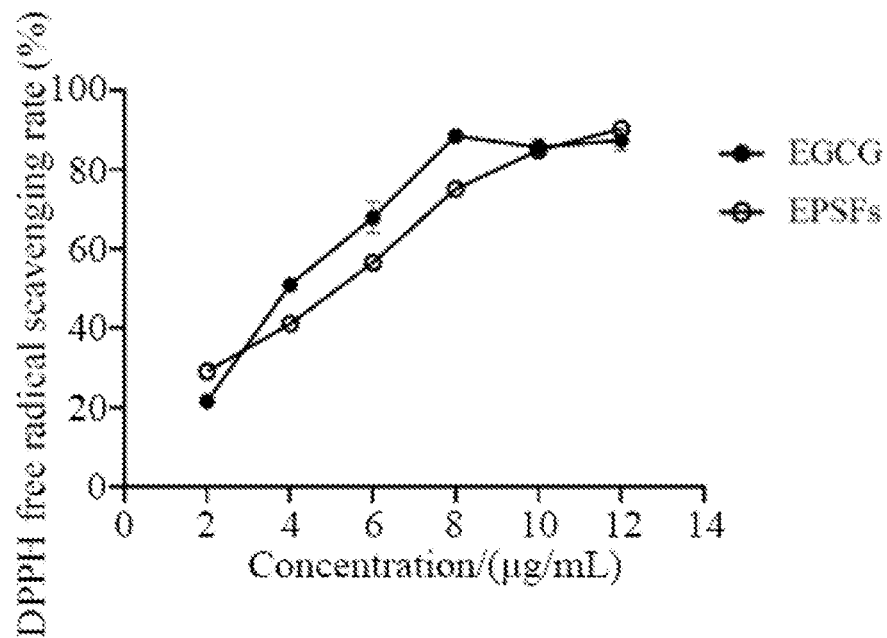
Figure 2B:
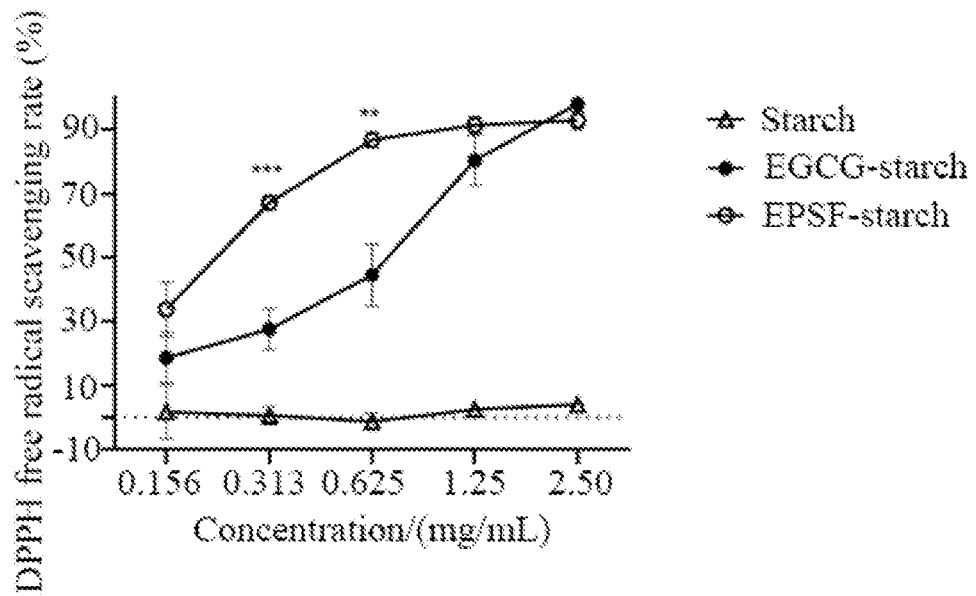

Referring to Tables 2-1 and 2-2, curves of DPPH radical scavenging rate versus sample concentrations were plotted, as shown in FIGS. 2A and 2B. FIG. 2A represents a curve of DPPH radical scavenging rate versus different concentrations of EPSFs and EGCG, and FIG. 2B represents a curve of DPPH radical scavenging rate versus different concentrations of starch, EPSF-starch, and EGCG-starch. Combining Tables 2-1, 2-2, and FIGS. 2A and 2B, it can be seen that: within a concentration of 10-12 μg/mL, both of EPSFs and EGCG have a DPPH free radical scavenging rate of over 80%; within a concentration of 4-8 μg/mL, EPSF has a DPPH free radical scavenging rate lower than that of EGCG. However, when EPSFs can be grafted onto the starch, at a concentration of 2.5 mg/mL, both of EGCG and EPSF-starch can achieve a DPPH free radical scavenging rate of 90%; at a concentration of 0.156-1.25 mg/mL, EPSF-starch has a significantly higher DPPH free radical scavenging rate than that of EGCG-starch, and has a dose-dependent scavenging effect. This may be due to the stronger coordination effect of structures of EPSFs and starch compared with that of EGCG and starch, which allows that it has better antioxidative activity, thereby resulting in different antioxidative capacity of the two graft copolymers. Blank starch, on the other hand, does not have the ability to scavenge free radicals, possibly due to the presence of intermolecular and intramolecular hydrogen bonds, which results in inability of blank starch to scavenge free radicals. The above results indicate that the combination of two molecules (i.e., EGCG and EPSFs) with starch can enhance the scavenging ability of starch to DPPH free radicals, and EPSF-starch has a stronger DPPH free radical scavenging ability compared with EGCG-starch.

The ABTS free radical scavenging rate of EPSF-starch was measured as follows: 100 mg of ABTS and 34.4 mg of potassium persulfate were dissolved in 25 mL of distilled water. They were shaken well, and stored at ambient temperature in dark for 12-16 hours. Before use, the resulting solution was diluted with methanol, such that an obtained solution had an absorbance value of 0.7±0.02 at 734 nm, i.e., ABTS free radical working solution (being prepared when using).

EPSFs in Example 1 and EGCG in Comparative Example 1 were dispersed uniformly in methanol, obtaining dispersions with mass concentrations of 2 μg/mL, 4 μg/mL, 6 μg/mL, 8 μg/mL, 10 μg/mL and 12 μg/mL. The corn starch and EPSF-starch in Example 1, as well as the EGCG-starch in Comparative Example 1, were uniformly dispersed in methanol obtaining dispersions with mass concentrations of 0.156 mg/mL, 0.313 mg/mL, 0.625 mg/mL, 1.25 mg/mL, and 2.50 mg/mL. 1.0 mL of the above sample solutions and 3.0 mL of the ABTS free radical working solution were added to the test tube in sequence, and they were shaken well, and reacted at ambient temperature in dark for 5 minutes. The absorbance $A_1$ thereof was measured at 734 nm. The sample solutions were replaced with methanol and the absorbance $A_0$ thereof was measured according to the above method. EGCG, starch, and EGCG-starch functioned as control groups, and the ABTS free radical scavenging rates thereof were determined according to the above method. Experiment of each group was repeated three times, and the ABTS free radical scavenging rate of each sample was calculated according to Equation 2. The results are listed in Tables 3-1 and 3-2.

$$ABTS \text{ free radical scavenging rate}\% = \frac{A_0 - A_1}{A_0} \times 100\%; \quad \text{Equation 2}$$

where $A_0$ represents the absorbance of a mixture of the sample dispersion and methanol; and $A_1$ represents the absorbance of the sample dispersion and ABTS radical solution.

TABLE 3-1

ABTS free radical scavenging rates of samples

| Concentration/(μg/mL) | ABTS free radical scavenging rate/% | |
|---|---|---|
| | EGCG | EPSFs |
| 2 | 51.91 ± 2.1 | 19.83 ± 1.75 |
| 4 | 78.8 ± 1.73 | 31.44 ± 2.83 |
| 6 | 91.49 ± 1.23 | 42.68 ± 2.06 |
| 8 | 94.38 ± 2.07 | 49.03 ± 0.9 |
| 10 | 95.17 ± 1.8 | 60.06 ± 2.19 |
| 12 | 95.24 ± 1.69 | 59.34 ± 2.06 |

TABLE 3-2

ABTS free radical scavenging rates of samples

| Concentration/(mg/ml) | ABTS free radical scavenging rate/% | | |
|---|---|---|---|
| | Starch | EGCG-starch | EPSF-starch |
| 0.156 | / | 1.12 ± 1.01 | 5.66 ± 4.13 |
| 0.313 | / | 9.71 ± 2.95 | 27.02 ± 0.63 |

TABLE 3-2-continued

ABTS free radical scavenging rates of samples

| Concentration/(mg/ml) | ABTS free radical scavenging rate/% | | |
|---|---|---|---|
| | Starch | EGCG-starch | EPSF-starch |
| 0.625 | / | 27.68 ± 6.71 | 40.52 ± 3.35 |
| 1.25 | / | 49.52 ± 8.33 | 58.04 ± 5.91 |
| 2.5 | 0.06 ± 0.02 | 72.69 ± 1.83 | 76.3 ± 1.17 |

Figure 3A:
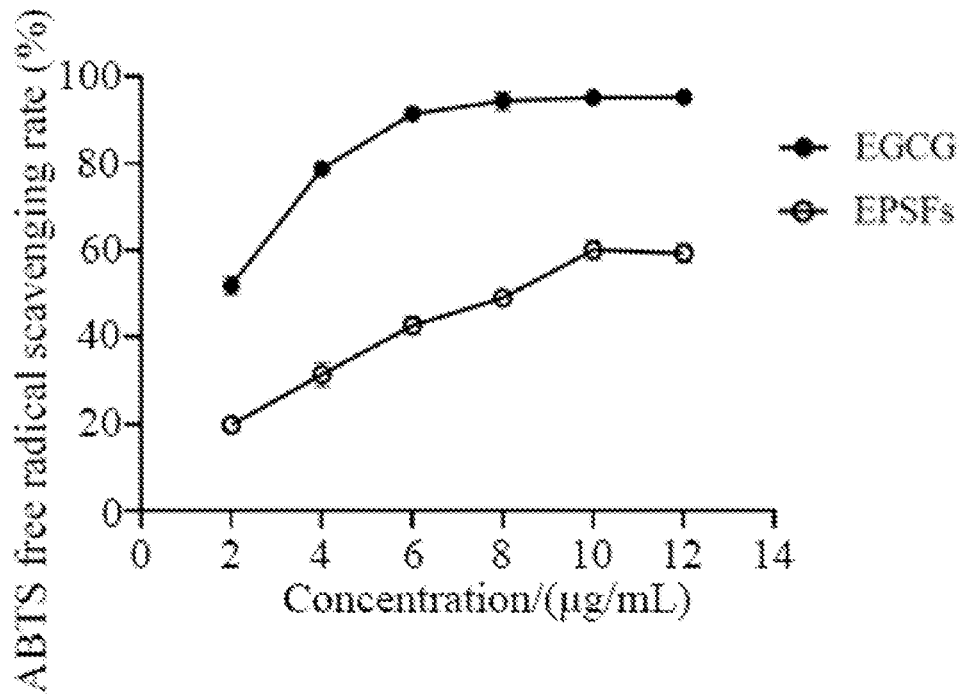
Figure 3B:
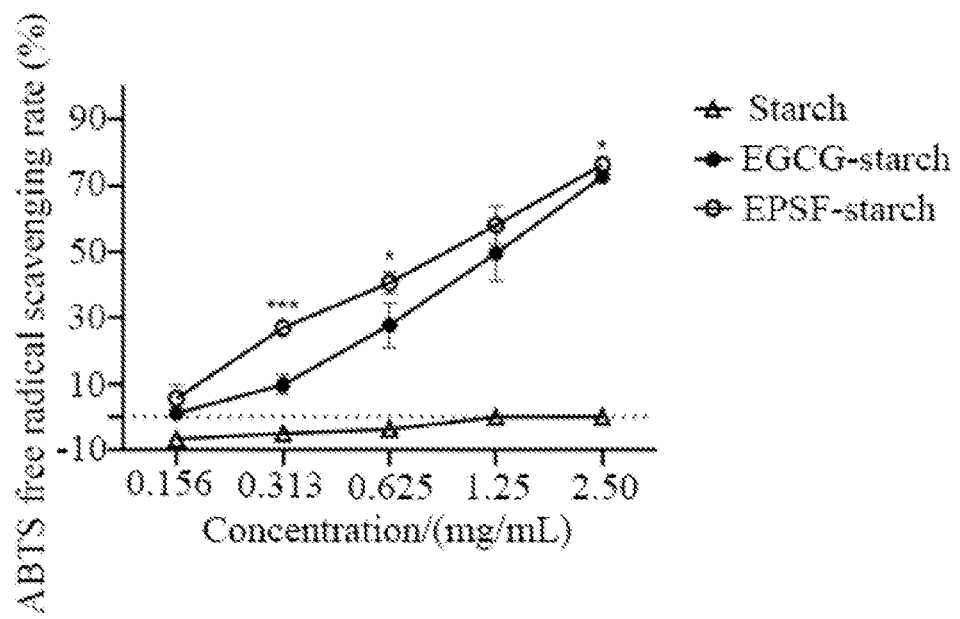

Referring to Tables 3-1 and 3-2, curves of ABTS radical scavenging rate versus different sample concentrations were plotted, as shown in FIGS. 3A and 3B. FIG. 3A shows a curve of ABTS radical scavenging rate versus different concentrations of EPSFs and EGCG, and FIG. 3B shows a curve of ABTS radical scavenging rate versus different concentrations of starch, EPSF-starch, and EGCG-starch. Referring to Tables 3-1, 3-2, and FIGS. 3A and 3B, it can be seen that: both the monomers and graft copolymers exhibit a dose-dependent ABTS radical scavenging effect; within a concentration of 2-12 µg/mL, EPSFs exhibit an ABTS free radical scavenging rate significantly lower than that of EGCG, and EPSFs actually exhibit an ABTS free radical scavenging rate not exceeding 60%; however, when EPSFs can be grafted onto the starch, at a concentration of 2.5 mg/mL, EPSF-starch exhibits an ABTS free radical scavenging rate reaching 79.29%; within a concentration of 0.156-2.5 mg/mL, EPSF-starch exhibits an ABTS free radical scavenging rate higher than that of EGCG-starch. This may be due to the stronger coordination effect of structures of EPSFs and starch than that of EGCG-starch, which allows excellent antioxidative activity, thereby resulting in a difference in the antioxidative capacity of the two graft copolymers. Blank starch, on the other hand, does not have the ability to scavenge free radicals, possibly due to the presence of intermolecular and intramolecular hydrogen bonds, which results in inability of blank starch to scavenge free radicals. The above results indicate that the combination of two molecules (i.e., EGCG and EPSFs) with starch can enhance the ability of starch to scavenge ABTS free radicals, and EPSF-starch has a stronger ability to scavenge DPPH free radicals compared with EGCG-starch.

The inhibition ability of EPSF-starch against the hydrolysis by α-amylase was determined: EPSF-starch in Example 1 and EGCG-starch in Comparative Example 1 were dissolved separately in an aqueous solution of methanol (with a volume ratio of methanol to water being 1:1), obtaining dispersions with mass concentrations of 4.375 mg/mL, 8.75 mg/mL, 17.5 mg/mL, 35 mg/mL, and 70 mg/mL. 50 mg of α-amylase was dissolved in 50 mL of PBS buffer ($20 \times 10^{-3}$ mol/L, the pH value being 7.4).

300 µL of sample solutions with different concentrations were taken and placed into different test tubes respectively. 300 µL of α-amylase solution was then added to each of the aforementioned tubes. They were incubated for 25 minutes, and 500 µL of DNS solution was then added thereto. The resulting mixture was reacted at 100° C. for 5 minutes. The absorbance $A_1$ thereof was measured at 540 nm by using an microplate reader. The absorbance $A_0$ of natural corn starch solutions with different concentrations was measured according to the above method. Experiment of each group was repeated for three times. The inhibition rates of samples against α-amylase were calculated according to Equation 3. The results are shown in Table 4.

$$\text{Inhibition rates against } \alpha\text{-amylase}\% = \frac{A_0 - A_1}{A_0} \times 100\%; \quad \text{Equation 3}$$

where $A_0$ represents the absorbance of the corn starch solution; and $A_1$ represents the absorbance of a mixture of the sample dispersion and the α-amylase solution.

TABLE 4

Inhibition rates against α-amylase of samples

| Concentration/(mg/ml) | Inhibition rates against α-amylase/% | |
|---|---|---|
| | EGCG-starch | EPSF-starch |
| 4.375 | 1.43 ± 4.43 | 2.23 ± 7.15 |
| 8.75 | 10 ± 4.05 | 17.44 ± 5.32 |
| 17.5 | 26.19 ± 4.57 | 31.8 ± 2.08 |
| 35 | 47.98 ± 3.58 | 64.12 ± 3.92 |
| 70 | 80.58 ± 3.5 | 92.32 ± 6.59 |

Figure 4:
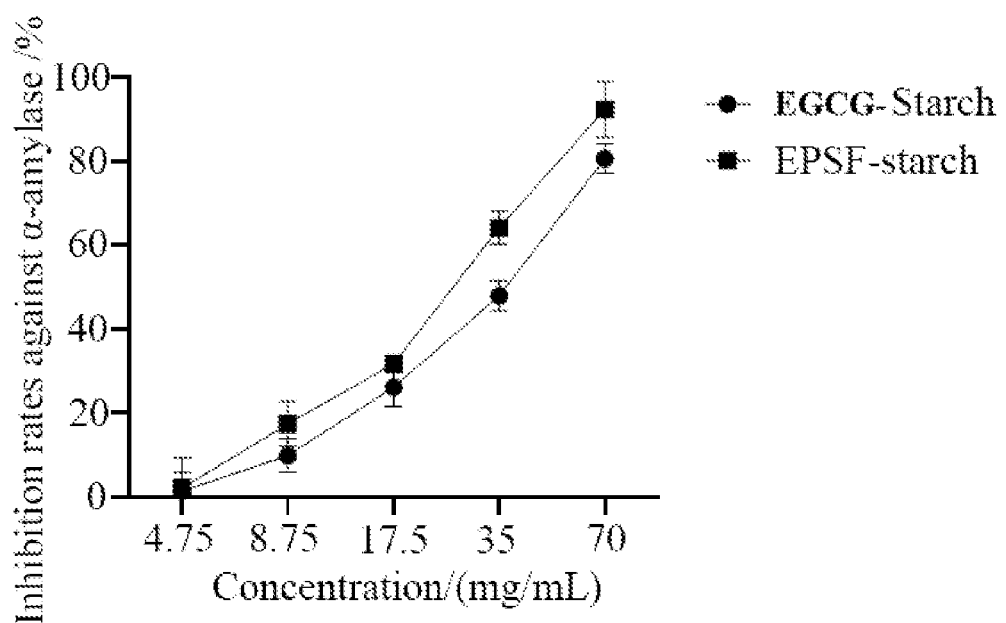
FIG. 4 shows curves of inhibition rates against a-amylase versus different concentrations of EPSF-starch and EGCG-starch.

Referring to Table 4, curves of inhibition rate against α-amylase versus sample concentrations were plotted, as shown in FIG. 4. Referring to Table 4 and FIG. 4, it can be seen that: among compounds to be tested, EPSF-starch exhibits greater inhibition ability against the hydrolysis by α-amylase compared with EGCG-starch, possibly due to a greater inhibition ability of EPSFs against the hydrolysis by α-amylase compared with EGCG; within a concentration of 4.375-70 mg/mL, EPSF-starch exhibits inhibition ability against the hydrolysis by α-amylase, and has a dose-dependent inhibition effect; and the highest scavenging rate can be 96.92% when the concentration of the graft copolymer can be 70 mg/mL.

The EPSF-starch graft copolymer according to the present disclosure has good resistance to oxidation, photostability, anticancer activity, and the ability to inhibit hydrolysis by amylase, which provides a new perspective for the use and development of EPSFs, which can be applied in more fields.

All patents and patent applications, test procedures (such as ASTM methods, UL methods, and the like), and other documents cited herein can be fully incorporated by reference to the extent such disclosure can be not inconsistent with this disclosure and for all jurisdictions in which such incorporation can be permitted.

Certain embodiments and features can be described using a set of numerical upper limits and a set of numerical lower limits. It should be appreciated that ranges including the combination of any two values, e.g., the combination of any lower value with any upper value, the combination of any two lower values, and/or the combination of any two upper values can be contemplated unless otherwise indicated. Certain lower limits, upper limits and ranges appear in one or more claims below.

The foregoing has also outlined features of several embodiments so that those skilled in the art can better understand the present disclosure. Those skilled in the art should appreciate that they can readily use the present disclosure as a basis for designing or modifying other methods or devices for carrying out the same purposes and/or achieving the same advantages of the embodiments disclosed herein. Those skilled in the art should also realize that such equivalent constructions do not depart from the spirit and scope of the present disclosure, and that they can make various changes, substitutions, and alterations herein without departing from the spirit and scope of the present disclosure, and the scope thereof can be determined by the claims that follow.

We claim:

1. An N-ethyl-2-pyrrolidinone-substituted flavan-3-ol (EPSF)-starch graft copolymer, having a structural formula represented by formula I or formula II,

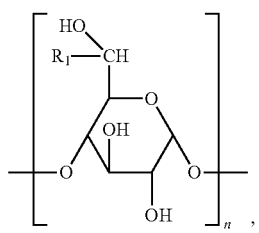
formula I

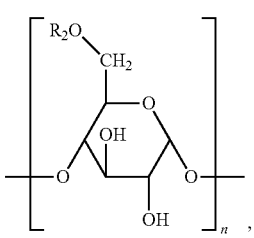
formula II wherein each of $R_1$ and $R_2$ is independently one selected from the group consisting of

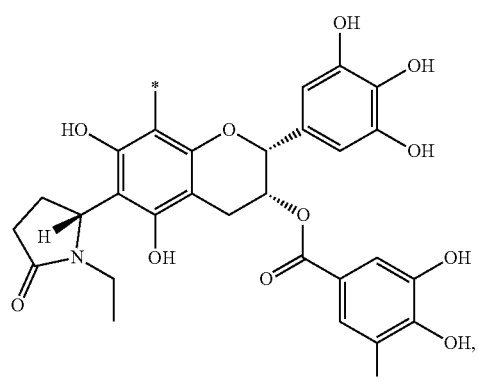
formula 1

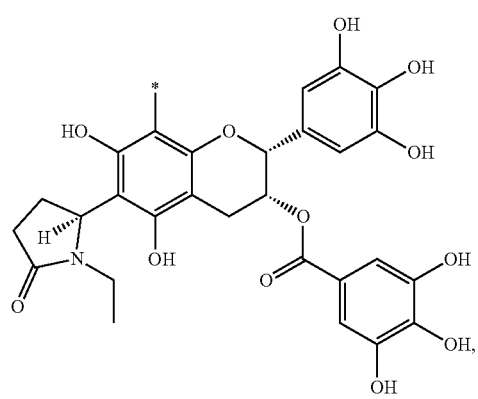
formula 2

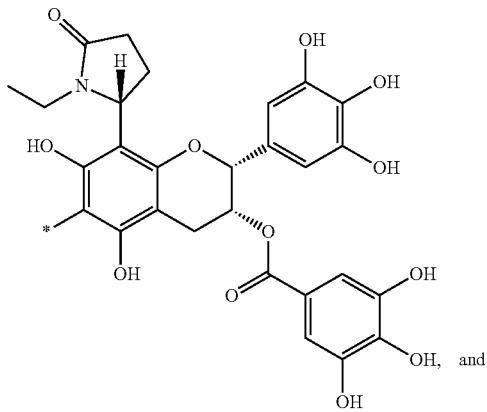
formula 3

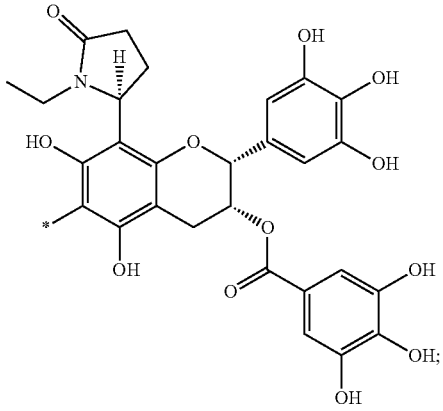
formula 4 and
* in formulas 1 to 4 represents a point of attachment.

2. The EPSF-starch graft copolymer as claimed in claim 1, wherein the EPSF-starch graft copolymer has a grafting rate of 15-36 mg/g.

3. A method for preparing the N-ethyl-2-pyrrolidinone-substituted flavan-3-ol (EPSF)-starch graft copolymer as claimed in claim 1, comprising the steps of
dissolving an EPSF and a starch in a polar organic solvent, to obtain a raw material solution; and
mixing the raw material solution with ascorbic acid and hydrogen peroxide to obtain a mixture, and subjecting the mixture to a grafting reaction, to obtain the EPSF-starch graft copolymer.

4. The method as claimed in claim 3, wherein the starch comprises one selected from the group consisting of corn starch, potato starch, wheat starch, and mung bean starch; and
a mass ratio of the N-ethyl-2-pyrrolidinone-substituted flavan-3-ol to the starch is in a range of 1:1 to 1:16.

5. The method as claimed in claim 3, wherein the dissolving is performed at a temperature of 60-80° C. for 25-35 minutes.

6. The method as claimed in claim 3, wherein a mass ratio of ascorbic acid to the starch is in a range of (1-2): (10-20); and
a mass ratio of ascorbic acid to hydrogen peroxide is in a range of (0.1-0.2): (0.1-0.2).

7. The method as claimed in claim 3, wherein the grafting reaction is performed for 3-48 hours.

8. The method as claimed in claim 3, wherein the grafting reaction is carried out in an atmosphere of a protective gas; and the protective gas comprises one selected from the group consisting of nitrogen and helium.

9. The method as claimed in claim 3, further comprising, after the grafting reaction, subjecting a system obtained from the grafting reaction to dialysis and drying in sequence, the dialysis being performed with a molecular weight cutoff of 8,000-12,000 Da.

10. The method as claimed in claim 4, wherein the dissolving is performed at a temperature of 60-80° C. for 25-35 minutes.

11. The method as claimed in claim 6, wherein the grafting reaction is performed for 3-48 hours.

12. The method as claimed in claim 3, wherein the EPSF-starch graft copolymer has a grafting rate of 15-36 mg/g.

* * * * *